United States Patent

[11] 3,560,804

[72] Inventors Emiel Goossens
Aartselaar;
Herman Labedz, Risensart, Belgium
[21] Appl. No. 841,373
[22] Filed July 14, 1969
[45] Patented Feb. 2, 1971
[73] Assignee Automatic Electric Laboratories, Inc.
Northlake, Ill.
a corporation of Delaware

[54] BATTERY-FEED AND IMPULSING CIRCUIT USING A FAST-OPERATING RELAY
6 Claims, 2 Drawing Figs.

[52] U.S. Cl. .................... 317/155.5, 335/154
[51] Int. Cl. .................... H01h 47/02
[50] Field of Search .................... 335/151, 154, 112, 113; 317/155.5

[56] References Cited
UNITED STATES PATENTS
3,492,613 1/1970 Van Husen .................... 335/151

*Primary Examiner*—James D. Trammell
*Assistant Examiner*—Harry E. Moose, Jr.
*Attorneys*—Cyril A. Krenzer, K. Mullerheim, B. E. Franz and Glenn H. Antrim

ABSTRACT: A reed relay has an operating winding connected in series with an audiofrequency choke coil and an auxiliary winding coupled to the choke coil to aid fast operation and release of the contacts of the relay. The choke coil provides high impedance to voice signals, and its coupling to the auxiliary winding compensates for the tendency of the relay to operate more slowly than usual as a result of the inclusion of the high inductance of the choke coil in the operating circuit of the relay. Also, the auxiliary winding causes release of the contacts even though line leakage current is excessive. A varistor effectively functions to disconnect the auxiliary winding during transmission of voice signals.

INVENTORS
EMIEL GOOSSENS
HERMAN LABEDZ
BY Glenn H. Antrim
ATTORNEY

BATTERY-FEED AND IMPULSING CIRCUIT USING A FAST-OPERATING RELAY

BACKGROUND OF THE INVENTION

This invention pertains to battery-feed and impulsing circuits of telephone systems. Particularly, the present circuit uses encapsulated reed relays and audiofrequency choke coils to perform the functions of conventional telephone-type battery-feed relays.

The armature-type, telephone relays are now most commonly used for battery-feed relays in the prevalent electromechanical telephone systems. A battery-feed relay responds to operation of a calling subscriber's dial to repeat pulses for transmission to succeeding control circuits. Each one of the two conductors of a subscriber's line is connected through a separate portion of an operating winding to a source of direct current voltage. In addition to the windings functioning to operate the relay at low-frequency pulsing rates, the windings function as audiofrequency choke coils through which "talking" current is supplied to the subscriber's transmitter. The inductance required for the windings to function as choke coils can be obtained readily because each telephone-type relay has ample winding space on an iron core.

SUMMARY OF THE INVENTION

The battery-feed and impulsing relay circuits of this invention include fast-operating, encapsulated reed relays and separate choke coils. Through this arrangement the battery-feed circuits use relays of the same type used in switching matrices of new telephone systems having electronic, common control circuits.

Windings suitable for operating reed relays directly tend to have insufficient inductance for use as audiofrequency choke coils. In order to provide the required amount of impedance between each line and the battery of a telephone office, windings of iron-core choke coils are inserted between the windings of the reed relays and the battery. Since the serially connected choke coils modify the rate of changes of current flow in the windings of the reed relays, the reed relays may not operate as fast as usually expected, and therefore the advantage of their inherent fast operation to aid in forming pulses accurately may not be obtained.

In order to have fast operation of the reed relays that have choke coils in series with their operating windings, an auxiliary winding is placed on each reed relay, and the winding is connected to the respective choke coil. While the magnetic field of a choke coil is either expanding in response to closure of the line circuit or collapsing in response to opening the line circuit, the effect of the choke coil is to cause current flow in the auxiliary winding. This current flows in the required direction to increase magnetic flux induced by the operating winding of the relay through its reed blades in response to closure of a respective line, and in response to opening the line, the current flows in an opposite direction to oppose the magnetic flux. The advantage of the fast operation of a reed relay is therefore obtained in a battery-feed relay circuit. A additional advantage is that the opposing magnetic flux induced in response to opening a line switch causes the relay to release when the line leakage current through the operating winding is not sufficient to cause reoperation of the relay, but would be sufficient without the effect of the auxiliary winding 19 to maintain the relay operated.

DESCRIPTION OF THE PREFERRED EMBODIMENTS

Figure 1:
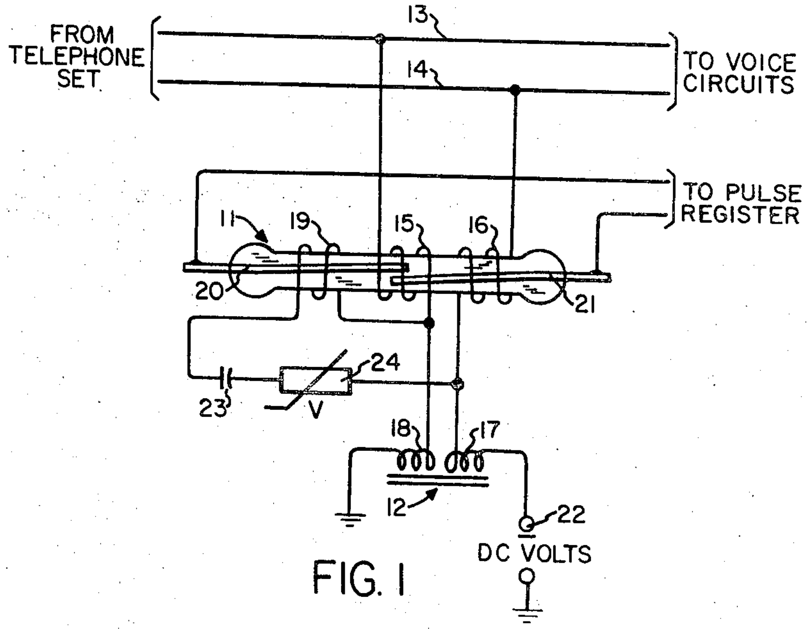
FIG. 1 is a schematic diagram of a battery-feed relay circuit having capacitive coupling between an auxiliary winding of the relay and a choke coil.

According to FIG. 1, a battery-feed relay circuit comprises a reed relay 11 for repeating control pulses, and a choke coil 12 for providing high impedance to voice Signals. Conductors 13 and 14 comprise a usual telephone line extending from a subscriber's telephone set. In order to balance the line longitudinally relative to ground, the reed relay 11 has an operating winding consisting of two equal portions 15 and 16, and likewise the choke coil 12 has a winding of two portions 17 and 18. In addition to the usual operating winding, the reed relay has an auxiliary winding 19 disposed on the envelope of the relay in a usual manner. The auxiliary winding 19 is connected to the choke coil 12 to aid fast operation of the contacts of the relay 11 and thereby to compensate for the tendency of the relay to operate more slowly because of the effect of the choke 12, and also the circuit that includes the auxiliary winding 19, causes the contacts of the relay 11 to open when leakage in the line connected to the operating windings 15 and 16 may otherwise be sufficient to maintain the relay closed. The reed blades 20 and 21 of the relay 11 are connected to a pulse register of electronic control circuits.

In detail, the conductor 13 of a subscriber's telephone line circuit is connected serially through an operating winding 15 of the reed relay 11 and a winding 18 of the choke coil 12 to ground; the other conductor 14 is connected through a winding 16 of the relay and a winding 17 of the choke coil to a negative terminal 22 of a source of direct current. The auxiliary winding 19 of the reed relay is connected in series with a capacitor 23 and a varistor 24, and this series circuit is connected between the two terminals of the coil windings that are connected to the operating windings 15 and 16 of the relay. In a typical battery-feed circuit, the capacitance of the capacitor 23 is 2.2 microfarads.

Figure 2:
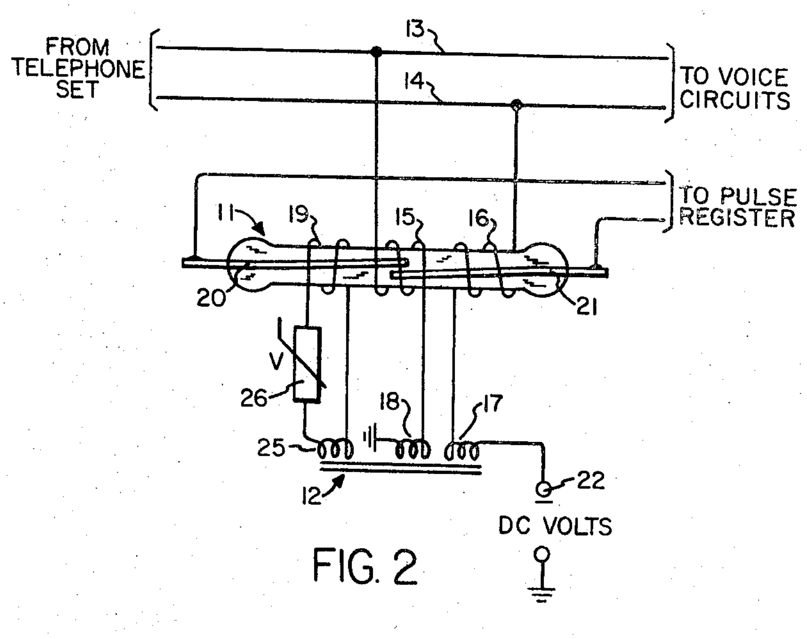
FIG. 2 is a schematic diagram of another embodiment of a battery-feed relay circuit having an additional winding on the choke coil for inductively coupling the auxiliary winding to the choke coil.

The circuit of FIG. 2 is similar to the circuit described in detail above except that the coupling of the auxiliary winding 19 of the reed relay 11 to the choke coil 12 is inductive rather than capacitive. The choke coil 12 has an additional winding 25 connected in series with the auxiliary winding 19. A varistor 26 in series with the windings 19 and 24, offers high resistance during voice communication to prevent excessive shunting he impedance of windings 17 and 18 of the choke coil.

The effects of the choke coil 12 and the auxiliary winding 19 of the relay 11 to adapt a reed relay to a battery-feed and impulsing circuit may be understood more clearly with reference to the operation of the circuit shown in FIG. 1. When pulsing contacts (not shown) are closed across the line conductors 13 and 14, current flow in the same sense in the portions 15 and 16 of the operating winding of the relay 11 causes magnetic flux in the reed blades 20 and 21. The rate of increase of flux through the blades to cause their operation tends to be slower as the result of the inductive impedance of the windings 17 and 18 which are connected in an aiding sense on the choke 12. However, current flow through the auxiliary winding 19 compensates for this delay.

Before the pulsing contacts connected across the line conductors 13 and 14 are closed, the voltage across the capacitor 23 is the voltage of the direct-current source connected to the terminal 22. Upon closing the pulsing contacts, the initial voltage drop across the windings 17 and 18 of the choke coil 12 is much greater than the voltage drop across the windings 15 and 16 of the reed relay 11 because of a greater inductance of the choke coil 12. Therefore, only the relatively low voltage appearing across the operating windings 15 and 16 is applied to the auxiliary circuit that includes the capacitor 23. Current flow for partly discharging the capacitor 23 flows through the varistor 24 and the auxiliary winding 19. Since the current flow tends to be quite high, and a relatively high peak current is instantly available to flow through the auxiliary winding 19 in the proper sense to aid operation of the reed blades 20 and 21 of the reed relay 11. By the time the capacitor 23 is substantially discharged, the impedance of the choke coil 12 has decreased until sufficient current flows through the portions 15 and 16 of the operating winding of the relay 11 to maintain the reed blades 20 and 21 closed.

When the switch contacts across the line conductors 13 and 14 are opened, the collapsing field of the choke coil 12 momentarily causes a high voltage with the same polarity as the source of direct-current voltage connected to terminal 22, to be applied to the auxiliary circuit to recharge the capacitor 23. High current flows momentarily through the auxiliary winding 19 in a sense opposite to that described above the oppose the flux generated by the operating winding. The field about the reed relay collapses quickly to allow the contacts of the relay to open. The opposing field caused by the auxiliary winding 19 not only causes the contacts of the relay 11 to open more quickly and therefore to follow pulses more accurately when line conditions are ideal, but also causes the contacts to open when the leakage current between the conductors 13 and 14 of the line is not sufficient to close the contacts of relay 11 but is sufficient to prevent their release. When the battery-feed and impulsing circuit is functioning to supply battery current during voice communication, the voltage across the auxiliary circuit is relatively low, and the resistance of the varistor 24 is high enough to prevent substantial reduction in the impedance of the parallel choke coil 12.

The circuit according to FIG. 2 operates in a similar manner. Upon closing a switch connected across the line conductors 13 and 14, current is induced into the circuit including the auxiliary winding 19 of the reed relay 11 and the winding 25 of the choke coil 12 by the expanding field of the choke coil. The windings 19 and 25 are connected in the proper sense to aid the operating winding of the relay 11. As a field about the choke coil 12 collapses in response to the line being opened, the current flow in the auxiliary winding 19 reverses so that it opposes the magnetic field that has been established about the reed relay 11.

We claim:

1. A battery-feed and impulsing relay circuit comprising: a telephone line, an electromagnetic switching element, an operating winding and an auxiliary winding magnetically coupled directly to said switching element to induce magnetic flux through said element in response to flow of current through said windings, the operation and release of said element being determined by current flow in said operating winding, the magnetic flux being modified to change the rate of the operation and release of said switching element in response to current flow in said auxiliary winding, a choke coil, a source of direct current, an operating circuit for said switching element including said source, said choke coil, said operating winding and said line connected sequentially, coupling means for coupling said auxiliary winding to said choke coil to induce current in said auxiliary winding in response to change of magnetic field of said choke coil as a result of change of current in said operating winding, and said auxiliary winding being connected in the required sense to aid said operating winding in operating and in releasing said switching element.

2. In a relay circuit according to claim 1 in which said electromagnetic switching element is an encapsulated reed relay.

3. In a relay circuit according to claim 2 in which said coupling means includes a capacitor, said capacitor and said auxiliary winding being connected in series across said choke coil.

4. In a relay circuit according to claim 3 in which a varistor is connected in series with said capacitor and said auxiliary winding.

5. In a relay circuit according to claim 2 in which said choke coil has an additional winding, said coupling means including said additional winding connected in series with said auxiliary winding.

6. In a relay circuit according to claim 5 in which a varistor is connected in series with said additional winding and said auxiliary.